United States Patent [19]

Nakamura et al.

[11] Patent Number: 5,472,988

[45] Date of Patent: Dec. 5, 1995

[54] PROCESS FOR PRODUCING POLYISOCYANURATE FOAMS

[75] Inventors: Satoshi Nakamura; Hirokatsu Shirahata, both of Tokyo, Japan

[73] Assignee: Nisshinbo Industries, Inc., Tokyo, Japan

[21] Appl. No.: 287,897

[22] Filed: Aug. 9, 1994

[30] Foreign Application Priority Data

Jul. 22, 1993 [JP] Japan .................. 20125893

[51] Int. Cl.⁶ .................................. C08G 18/16
[52] U.S. Cl. .......................... 521/107; 521/902
[58] Field of Search ................... 521/107, 902

[56] References Cited

U.S. PATENT DOCUMENTS

| | | | |
|---|---|---|---|
| 4,393,015 | 7/1983 | Kaneda et al. | 264/51 |
| 5,026,737 | 6/1991 | Ohnuma et al. | 521/78 |
| 5,102,918 | 4/1992 | Moriya | 521/159 |
| 5,102,923 | 4/1992 | Porosoff et al. | 521/159 |
| 5,317,034 | 5/1994 | Nakamura et al. | 521/129 |

FOREIGN PATENT DOCUMENTS

| | | |
|---|---|---|
| 58-208317 | 12/1983 | Japan . |
| 59-161423 | 9/1984 | Japan . |
| 60-69118 | 4/1985 | Japan . |
| 60-133034 | 7/1985 | Japan . |
| 60-166315 | 8/1985 | Japan . |
| 63-213512 | 9/1988 | Japan . |
| 3-195717 | 8/1991 | Japan . |
| 60-76540 | 5/9185 | Japan . |

*Primary Examiner*—Morton Foelak
*Attorney, Agent, or Firm*—Wenderoth, Lind & Ponack

[57] ABSTRACT

A process for producing polyisocyanurate foam which comprises reacting an organic polyisocyanate with a polyol and water in the presence of a halogen-free aliphatic phosphoric ester having a molecular weight of 140 to 270 and a trimerization catalyst. Polyisocyanurate foams having good adhesion to membrane such as paper, iron, aluminium, plywood and the like can be obtained without use of an volatile blowing agent such as CFCs, HCFCs and HFCs and even at low density according to the present process.

7 Claims, No Drawings

PROCESS FOR PRODUCING POLYISOCYANURATE FOAMS

This invention relates to a process for producing a polyisocyanurate foam and, more particularly, to a process for producing a polyisocyanurate foam suitable for continuous production of laminate boardstock, insulation boardstock and the like and having good adhesion to membrane of paper, iron, aluminium, plywood and the like.

Heretofore, rigid polyurethane foams and polyisocyanurate foams have been used in a large amount as heat insulating materials for panels, boards, chiefly because they have low thermal conductivities and low densities and are easy to handle. Although chlorofluorocarbons represented by CFC-11 have been used as blowing agents used in production of these foams, it has recently been revealed that there is a possibility that chlorofluorocarbons destroy the ozone layer in the stratosphere and have bad influences on the ecological system, and it came to be necessary to stop their use.

As alternative foaming processes, there are a process which comprises using hydrogen-containing chlorofluorocarbons (HCFCs); a process which comprises utilizing carbon dioxide formed by reaction of water and an isocyanate; etc., but the HCFCs tend toward being controlled in future. On the other hand, foaming by reaction of water with an isocyanate has several problems, one of which is that urea bond formed together with formation of carbon dioxide lowers adhesiveness of the resultant foam. The lowering is striking particularly in the case of polyisocyanurate foams.

Several reports were made in the past about improvement in adhesion of polyurethane foams or polyisocyanurate foams by usual prescription, and there can, for example, be cited a process which comprises using a special polyol (see U.S. Pat. No. 4,393,015, Japanese Laid-Open Patent Publication No. 69118/1985, Japanese Laid-Open Patent Publication No. 166315/1985, etc.); a process which comprises using a benzylic ether type phenol resin, or using one together with a polyoxyethylenepropylenepolyol (see Japanese Laid-Open Patent Publication No. 208317/1983, Japanese Laid-Open Patent Publication No. 213512/1988, etc.); a process which comprises using an aromatic isocyanate and an aliphatic isocyanate together (see Japanese Laid-Open Patent Publication No. 161423/1984); a process which comprises adding an ethylene glycol (see Japanese Laid-Open Patent Publication No. 133034/1985); a process which comprises adding a halogen-containing phosphoric ester (see Japanese Laid-Open Patent Publication No. 76540/1985); a process which comprises combining specific catalysts (see U.S. Pat. No. 5,026,737); a process which comprises converting an isocyanate component to a prepolymer (see Japanese Laid-Open Patent Publication No. 195717/1991); etc. However, any of those processes proposed were unsatisfactory for adhesion between polyisocyanurate foams and membrane of paper, iron, aluminium, plywood and the like, in the case of no use of volatile blowing agents such as CFCs.

The present inventors have intensely researched for enhancing adhesion of polyisocyanurate foams in the case of no use of volatile blowing agents such as CFCs to membrane, and as a result have now found that a polyisocyanurate foam having high adhesion can be obtained by reacting an organic polyisocyanate with a polyol and water in the presence of an aliphatic phosphoric ester containing no halogen and having a molecular weight of 140 to 270 and a trimerization catalyst.

Thus, there is provided according to the present invention a process for producing a polyisocyanurate foam which comprises reacting an organic polyisocyanate with a polyol and water in the presence of an aliphatic phosphoric ester containing no halogen and having a molecular weight of 140 to 270 and a trimerization catalyst.

Hereinafter, this invention will be described in more detail.

The organic polyisocyanates used in the process of this invention as starting materials may be any of aliphatic, alicyclic and aromatic types, and mixtures of these. Those conventionally used in the production of polyurethanes and polyisocyanurates can be used similarly. To be specific, suitable examples thereof include aromatic diisocyanates such as 2,4-tolylene diisocyanate, 2,6-tolylene diisocyanate, crude tolylene diisocyanate, diphenylmethane diisocyanate, and crude diphenylmethane diisocyanate; aromatic triisocyanates such as 4,4',4''-triphenylmethane triisocyanate, and 2,2',6-tolylene triisocyanate; aromatic tetraisocyanates such as 4,4'-di-methyldiphenylmethane- 2,2',5,5'-tetraiisocyanate, aliphatic isocyanates such as hexamethylene-1,6-diisocyanate; alicyclic isocyanates such as hydrogenated diphenylmethane diisocyanate; and other diisocyanates such as m-phenylene diisocyanate, naphthylene-1,5-diisocyanate, 1,-methoxyphenyl- 2,4-diisocyanate, 4,4'-biphenyl diisocyahate, 3,3'-dimethoxy-4,4'-biphenyl diisocyanate, and 3,3'-dimethyldiphenylmethane-4,4'-diisocyanate. Among them, preferred are 2,4-tolylene diisocyanate, 2,6-tolylene diisocyanate, crude tolylene diisocyanate, diphenylmethane diisocyanate, crude diphenylmethane diisocyanate, hexamethylene-1,6-diisocyanate, hydrogenated diphenylmethane diisocyanate, etc. The above-described organic polyisocyanates may be used singly or two or more of them may be combined.

The polyols include aliphatic, saccharide, aromatic compounds having two or more hydroxyl groups in the molecule, and mixtures thereof, such as polyether polyols, polyester polyols, and castor oil. Those conventionally used in the production of polyurethanes can also be used similarly. Those polyols may be of either lower molecular weight or high molecular weight. Specific examples thereof include, as polyether polyols, those compounds having structures of active hydrogen-containing compounds such as polyhydric alcohols, polyhydric phenols, amines, or polycarboxylic acids to which alkylene oxides are added. As the polyhydric alcohols, there can be cited, for example, dihydric alcohols such as ethylene glycol, propylene glycol, 1,4-butanediol, 1,6-hexanediol, diethylene glycol, and neopentyl glycol; trihydric or higher polyhydric alcohols such as pentaerythritol, and surcrose. As the polyhydric phenols, there can be cited, for example, polyhydric phenols such as pyrogallol, and hydroquinone; bisphenols such as bisphenol A; condensates of phenol and formaldehyde; and so on. As the amines, there can be cited, for example, ammonia, alkanolamines such as mono-, di- and triethanolamines, isopropanolamine, and aminoethylethanolamine; $C_1$–$C_{22}$ alkylamines, $C_2$–$C_6$ alkylenediamines, polyalkylenepolyamines, aromatic amines such as aniline, phenylenediamine, diaminotoluene, xylenediamine, methylenedianiline, and diphenyletherdiamine, alicyclic amines such as isophoronediamine, and cyclohexylenediamine, heterocyclic amines, and so on. As the polycarboxylic acids, there can be cited, for example, aliphatic polycarboxylic acids such as succinic acid, adipic acid, sebacic acid, maleic acid, and dimeric acid, aromatic polycarboxylic acids such as phthalic acid, terephthalic acid, trimellitic acid, and pyromelitic acid, etc. These active hydrogen-containing compounds may also be used as a mixture of two or more of them. As the alkylene oxides to be added to the active hydrogen-containing compounds, there can be cited, for example, propylene oxide, ethylene oxide, butylene oxide, tetrahydrofuran, etc. These alkylene oxides may be used singly or two or more of them may be used in combination. In the latter case, there may be blocked adducts or randomly added products. As the polyester polyols, there can be cited, for example, condensed polyester polyols obtained by the reaction between polyhydric alcohols (the aforementioned alcohols, trimethylolpropane, glycerol, etc.) and carboxylic acids (the aforementioned polycarboxylic acids, etc.), polyester polyols obtained by ring opening polymerization lactone, scrap PET to which ethylene oxide adduct of nonylphenol is added, and the like. Among them, aliphatic, aromatic, aliphatic or aromatic amine, pentaerythritol, or sucrose based polyether polyols; aromatic or aliphatic carboxylic acid polyester polyols; lactone polyester polyols; etc. are particularly preferred. The aforementioned polyols may be used singly or two or more of them may be used in combination.

The aforementioned polyols may have a hydroxyl number within the range of generally 20 to 600 mgKOH/g, preferably 25 to 500 mgKOH/g, more preferably 50 to 400 mgKOH/g.

According to the process of this invention, polyisocyanurate foams can be generated by the reaction of the aforementioned organic polyisocyanate with the aforementioned polyol together with water as a blowing agent. To perform the reaction, compounding proportions of the organic polyisocyanate, the polyol and water are not limited strictly, and may vary widely depending on desired physical properties and uses of final products of modified polyisocyanurate foams. Generally, it is preferred to react the aforementioned components after blending them such that isocyanate index expressed as NCO/OH equivalent ratio can become within the range of not below 1.8, preferably from 1.8 to 5, more preferably 2 to 4.

The amount of water to be used as a blowing agent can be controlled depending on the density and the like desired for final products of the polyisocyanurate foam. In particular, the process of this invention has a feature that foam having high adhesion can be produced by using only water and without using volatile blowing agents. According to the process of this invention, addition of water in amounts within the range of, for example, 0.3 to 3% by weight, preferably 0.8 to 2.5% by weight, based on the total weight of organic polyisocyanate, polyol and water enables production of a low density foam having a free rise density of generally not more than 50 kg/m³, preferably 25 to 35 kg/m³.

The characteristic of the process of the present invention lies in performing reaction for producing the polyisocyanurate foam from the organic polyisocyahate, the polyol and water, in the presence of the aliphatic phosphoric ester containing no halogen and having a molecular weight of 140 to 270 and the trimerization catalyst for isocyanates.

The above halogen-free aliphatic phosphoric esters can be those known per se, and there can, for example, be used those usually commercially available as dyes, antifoaming agents for detergents, metal extractants, diluents for catalysts for polyester resins or epoxy resins, and rubber additives. Specifically, there can, for example, be cited trimethyl phosphate, triethyl phosphate, tripropyl phosphate, tributyl phosphate, methyl diethyl phosphate, methyl dibutyl phosphate, ethyl dibutyl phosphate, etc. Among them, trimethyl phosphate, triethyl phosphate and tributyl phosphate are particularly preferably used. These phosphoric esters may be used singly or two or more of them may be used in combination.

The halogen-free aliphatic phosphoric ester can either be previously mixed with the organic polyisocyanate or mixed with the polyol component, or can be added at the time of the reaction in the present invention, but larger effect on adhesion can be obtained when the halogen-free aliphatic phosphoric ester is mixed with the organic polyisocyanate in advance and the mixture is reacted with the polyol and water in the presence of the trimerization catalyst. The reason is not certain, but the compatibility between the isocyanate component and the polyol component is surmised to contribute thereto.

The use amount of the halogen-free aliphatic phosphoric ester is not strictly limited and can freely be varied in accordance with properties required for products, etc., but is within the range of usually 1 to 20% by weight, preferably 2 to 15% by weight, particularly preferably 3 to 10% by weight.

The trimerization catalysts for isocyanates used together with the halogen-free aliphatic phosphoric esters are not particularly limited and trimerization catalysts for isocyanates known per se which have hitherto been used in production of polyurethane resins, polyisocyanurate resins, polyurethane-polyisocyanurate resins, etc. can be used likewise, and specific examples thereof include, for example, the following:

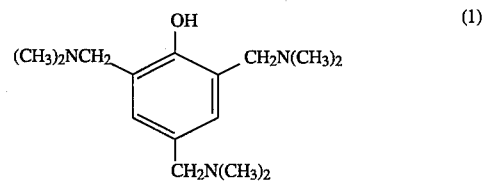

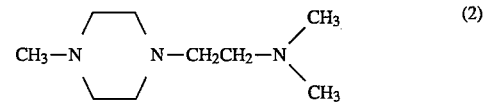

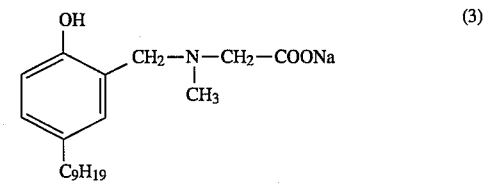

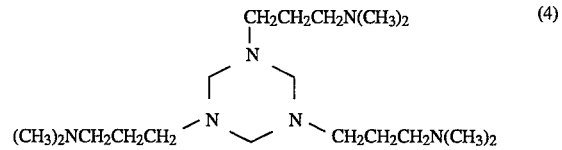

Alkali metal salts of $C_1$–$C_8$ aliphatic monocarboxylic acids, such as

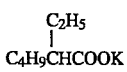

Salts of 1,8-diaza-bicyclo[5.4.0]undecene-7, such as

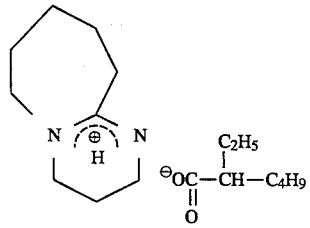

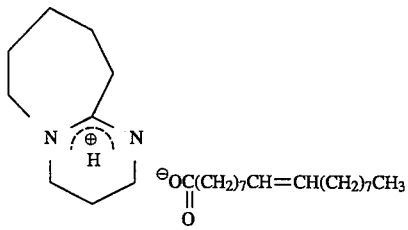

Hydroxyalkyl quaternary ammonium compounds, e.g.,

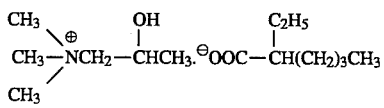

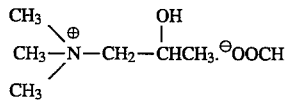

The above compounds of (1), (3), (5), (7) and (9) are particularly preferably among these trimerization catalysts.

The use amount of the above trimerization catalysts is not strictly limited, either, but is within the range of usually 0.2 to 5% by weight, preferably 0.3 to 4% by weight, more preferably 0.4 to 3% by weight based on the weight of the total reaction system.

In the process of this invention, there can be used various additives in combination in amounts usually used. Such additives include, for example, urethanation catalysts (for example, triethylenediamine, dimethylethanolamine, triethylamine, trimethylaminoethylethanolamine, dimethylaminoethylether, pentamethyldiethylenetriaime, N-methylmorpholine, dibutyltin dilaurate, tin octanoate, lead octanoate, etc.), surfactants (for example, dimethlsiloxane/ polyether block copolymer, etc.), crosslinking and chain extender agent (for example, ethylene glycol, propylene glycol, 1,4-butanediol, 1,6-hexanediol, diethylene glycol, triethanolamine, diethanolamine, ethylenediamine, toluenediamine, etc.), flame retardants (for example, triphenyl phosphate, cresyldiphenyl phosphate, tris(cresyl) phosphate, tris(chloroethyl) phosphate, tris(dichloropropyl) phosphate, tris(β-chloropropyl) phosphate, tris(B-chloroethyl) phosphate, tris(2,3-dibromopropyl) phosphate, tris(bromocresyl) phosphate, melamine, antimony triolxide, etc.), colorants, etc.

As the process for producing polyisocyanurate foams from the components described above, there can be cited, for example, a process in which first there are provided an isocyanate component composed of the aforementioned organic polyisocyanate or an isocyanate-terminated prepolymer obtained by reacting an organic polyisocyanate with a polyol, and a polyol component composed of the above-described polyol, water and trimerization catalysts, and optionally one or more of the urethanation catalyst, surfactant, crosslinking agent, flame retardant, colorant and other additives, and then a predetermined amount of a halogen-free aliphatic phosphoric ester is added to the isocyanate component or the polyol component or both components, and both components are quickly mixed with stirring at the time of use and then foamed and cured.

It is sufficient to set the reaction temperature at room temperature. In some cases, the reaction temperature may be elevated up to a temperature of about 90° C.

Hereinafter, this invention will be illustrated more concretely, by Examples.

EXAMPLES 1–15 AND COMPARATIVE EXAMPLES 1–14

A polyol component prepared by mixing each prescribed amount of the polyol, water, the catalyst, the surfactant and the phosphate as identified in the following Table 1, and an isocyanate component prepared by mixing a crude MDI (diphenylmethane diisocyanate) and a phosphate were mixed to make the total amount 100 g (200 g in Examples 12 to 14), and the mixture was stirred for 4 seconds with a hand mixer (2,200 rpm, stirrer: 30 mmφ). The mixture (80 g; 150 g in Example 12–14) was poured in a 150×150×150 mm wood box, and measurement was made of cream time, gell time and rise time. Cream time was defined as a time from liquefaction to initiation of foaming, gel time was defined as a time when the inside was cured (time when a thin glass stick pushed did not come to stick in the foam), and rise time was defined as a time from the initiation of foaming to completion of the foaming. A central portion of the cured foam was cut to a size of about 100×100×100 mm, and free rise density was calculated from its volume and weight.

On the other hand, as to adhesive strength, a sheet of aluminum laminated craft paper (craft 70 g; produced by Japan Matai Co.) was set inside a 300×300× 15 mm metal mold warmed to 60° C., and 50 g of the mixture (55 g in Example 11, 70 g in Examples 12 to 14) was injected therein in the same manner as in a free foam to mold a sample. The sample was released from the metal mold one minute after the injection and nicked at a width of 10 cm four minutes after the release. The craft paper was peeled using a spring balance, and the reading of the spring balance at that time was defined as adhesive strength which is shown by kg/10 cm.

The test on physical properties based on JIS A-9514 and the combustion test based on JIS A-1321 were further performed on the product of Example 5.

These results are shown in the following Table to Table 3.

TABLE 1

| | (Examples) | | | | | | | | | | | | | | |
|---|---|---|---|---|---|---|---|---|---|---|---|---|---|---|---|
| Example No. | 1 | 2 | 3 | 4 | 5 | 6 | 7 | 8 | 9 | 10 | 11 | 12 | 13 | 14 | 15 |
| Polyol[(1)] | | | | | | | | | | | | | | | |
| Polyol A | 19.7 | 19.7 | 19.7 | 19.7 | 19.7 | 19.7 | 19.7 | 19.5 | 19.9 | 20.2 | 19.9 | 20.3 | | | 19.9 |
| Polyol B | | | | | | | | | | | | | 20.3 | | |
| Polyol C | | | | | | | | | | | | | | 20.7 | |
| Water | 1.8 | 1.8 | 1.8 | 1.8 | 1.8 | 1.8 | 1.8 | 1.8 | 1.8 | 1.8 | 1.5 | 1.0 | 1.0 | 1.0 | 1.8 |
| Catalyst[(2)] | | | | | | | | | | | | | | | |
| DABCO K-15 | 2.2 | 2.2 | 2.2 | 2.2 | 2.2 | 2.2 | 2.2 | | | | 2.3 | 2.4 | 2.4 | 2.1 | 2.0 |
| DMP-30 | | | | | | | | 2.4 | | | | | | | |
| DABCO TMR | | | | | | | | | 2.0 | | | | | | |
| Curithene 52 | | | | | | | | | | 1.8 | | | | | |
| DABCO-T | 0.3 | 0.3 | 0.3 | 0.3 | 0.3 | 0.3 | 0.3 | 0.3 | 0.3 | 0.2 | 0.3 | 0.3 | 0.3 | 0.2 | 0.2 |
| Phosphoric ester[(3)] | | | | | | | | | | | | | | | |
| TMP | 5.0 | | | | | | | | | | | | | | |
| TEP | | 5.0 | | | | | 2.5 | | | | | | | | |
| TBP | | | 5.0 | | | | | | | | | | | | |
| Surfactant[(4)] | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Polyol component total | 30.0 | 30.0 | 30.0 | 25.0 | 25.0 | 25.0 | 27.5 | 25.0 | 25.0 | 25.0 | 25.0 | 25.0 | 25.0 | 25.0 | 25.0 |
| Crude MDI | 70.0 | 70.0 | 70.0 | 70.0 | 70.0 | 70.0 | 70.0 | 70.0 | 70.0 | 70.0 | 70.0 | 70.0 | 70.0 | 70.0 | 65.0 |
| TMP | | | | 5.0 | | | | | | | | | | | |
| TEP | | | | | 5.0 | | 2.5 | 5.0 | 5.0 | 5.0 | 5.0 | 5.0 | 5.0 | 5.0 | 10.0 |
| TBP | | | | | | 5.0 | | | | | | | | | |
| Isocyanate component total | 70.0 | 70.0 | 70.0 | 75.0 | 75.0 | 75.0 | 72.5 | 75.0 | 75.0 | 75.0 | 75.0 | 75.0 | 75.0 | 75.0 | 75.0 |
| Isocyanate index | 1.99 | 1.99 | 1.99 | 1.99 | 1.99 | 1.99 | 1.99 | 2.00 | 1.99 | 1.98 | 2.29 | 3.06 | 1.90 | 1.88 | 1.85 |
| Cream time (sec) | 5 | 6 | 7 | 6 | 6 | 7 | 6 | 5 | 6 | 9 | 7 | 8 | 8 | 8 | 6 |
| Gel time (sec) | 27 | 28 | 32 | 27 | 28 | 32 | 28 | 75 | 26 | 42 | 26 | 27 | 33 | 34 | 27 |
| Rise time (sec) | 42 | 45 | 52 | 42 | 45 | 52 | 45 | 85 | 42 | 61 | 40 | 36 | 52 | 54 | 41 |
| Free rise density (kg/m$^3$) | 22 | 22 | 23 | 22 | 22 | 23 | 22 | 19 | 22 | 23 | 30 | 40 | 41 | 41 | 24 |
| 15 mm t molding density (kg/m$^3$) | 35 | 35 | 35 | 35 | 35 | 35 | 35 | 35 | 35 | 35 | 40 | 50 | 50 | 50 | 50 |
| Adhesive strength to paper (kg/10 cm) | 1.13 | 1.10 | 1.02 | 1.31 | 1.22 | 1.08 | 1.13 | 1.08 | 1.26 | 1.24 | 1.21 | 1.41 | 1.38 | 1.35 | 1.31 |

TABLE 2

| | (Comparative tests) | | | | | | | | | | | | | |
|---|---|---|---|---|---|---|---|---|---|---|---|---|---|---|
| Example No. | 1 | 2 | 3 | 4 | 5 | 6 | 7 | 8 | 9 | 10 | 11 | 12 | 13 | 14 |
| Polyol[(1)] | | | | | | | | | | | | | | |
| Polyol A | 22.7 | 19.7 | 19.7 | 19.7 | 19.7 | 19.7 | 19.7 | 19.7 | 19.7 | 19.7 | 19.7 | 19.7 | 19.9 | 19.9 |
| Water | 1.8 | 1.8 | 1.8 | 1.8 | 1.8 | 1.8 | 1.8 | 1.8 | 1.8 | 1.8 | 1.8 | 1.8 | 1.8 | 1.8 |
| Catalyst[(2)] | | | | | | | | | | | | | | |
| DABCO K-15 | 2.2 | 2.2 | 2.2 | 2.2 | 2.2 | 2.2 | 2.2 | 2.2 | 2.2 | 2.2 | 2.2 | 2.2 | 2.2 | 2.0 |
| DABCO-T | 0.3 | 0.3 | 0.3 | 0.3 | 0.3 | 0.3 | 0.3 | 0.3 | 0.3 | 0.2 | 0.3 | 0.3 | 0.3 | 0.3 |
| Phosphoric ester[(3)] | | | | | | | | | | | | | | |
| TOP | | 5.0 | | | | | | | | | | | | |
| TCP | | | 5.0 | | | | | | | | | | | |
| CLP | | | | 5.0 | | | | | | | | | | |
| CR-530 | | | | | 5.0 | | | | | | | | | |
| Surfactant[(4)] | 1.0 | 1.0 | 1.0 | 1.0 | 1.0 | 1.0 | 1.0 | 1.0 | 1.0 | 1.0 | 1.0 | 1.0 | 1.0 | 1.0 |
| Polyol component total | 28.0 | 30.0 | 30.0 | 30.0 | 30.0 | 25.0 | 25.0 | 25.0 | 25.0 | 25.0 | 25.0 | 25.0 | 25.0 | 25.0 |
| Crude MDI | 72.0 | 70.0 | 70.0 | 70.0 | 70.0 | 70.0 | 70.0 | 70.0 | 70.0 | 70.0 | 70.0 | 70.0 | 65.0 | 65.0 |
| TOP | | | | | | | 5.0 | | | | | | 10.0 | |
| ODPP | | | | | | | | 5.0 | | | | | | |
| TCP | | | | | | | | | 5.0 | | | | | |

TABLE 2-continued

|  | (Comparative tests) | | | | | | | | | | | | | |
|---|---|---|---|---|---|---|---|---|---|---|---|---|---|---|
| Example No. | 1 | 2 | 3 | 4 | 5 | 6 | 7 | 8 | 9 | 10 | 11 | 12 | 13 | 14 |
| CLP |  |  |  |  |  |  |  |  | 5.0 |  |  |  |  | 10.0 |
| TMCPP |  |  |  |  |  |  |  |  |  | 5.0 |  |  |  |  |
| CR-530 |  |  |  |  |  |  |  |  |  |  | 5.0 |  |  |  |
| CR-505 |  |  |  |  |  |  |  |  |  |  |  | 5.0 |  |  |
| Isocyanate component total | 72.0 | 70.0 | 70.0 | 75.0 | 75.0 | 75.0 | 75.0 | 75.0 | 75.0 | 75.0 | 75.0 | 75.0 | 75.0 | 75.0 |
| Isocyanate index | 1.99 | 1.99 | 1.99 | 1.99 | 1.99 | 1.99 | 1.99 | 1.99 | 1.99 | 1.99 | 1.99 | 1.99 | 1.85 | 1.85 |
| Cream time (sec) | 8 | 7 | 7 | 7 | 7 | 7 | 7 | 7 | 7 | 7 | 7 | 7 | 7 | 7 |
| Gel time (sec) | 27 | 29 | 28 | 30 | 31 | 30 | 30 | 28 | 30 | 29 | 31 | 30 | 30 | 31 |
| Rise time (sec) | 44 | 48 | 46 | 48 | 49 | 48 | 47 | 46 | 49 | 48 | 49 | 49 | 49 | 50 |
| Free rise density (kg/m$^3$) | 22 | 22 | 23 | 22 | 22 | 23 | 22 | 22 | 23 | 22 | 23 | 22 | 22 | 22 |
| 15 mm t molding density (kg/m$^3$) | 35 | 35 | 35 | 35 | 35 | 35 | 35 | 35 | 35 | 35 | 35 | 35 | 35 | 35 |
| Adhesive strength to paper (kg/10 cm) | 0.11 | 0.27 | 0.15 | 0.10 | 0.11 | 0.32 | 0.28 | 0.18 | 0.11 | 0.13 | 0.17 | 0.21 | 0.41 | 0.28 |

Note (1): Polyols
Polyol A: Phthalic acid ester based polyol, hydroxyl number=145 (PL-106, manufactured by Toho Rika Industries)
Polyol B: Pentaerythritol based by polyol, hydroxyl number=410 (41ONE, manufactured by Asahi Glass);
Polyol C: Sugar-Aromatic amine based polyol, hydroxyl number=410 (RX-403, manufactured by Sanyo Chemical Industries);

DMP-30:

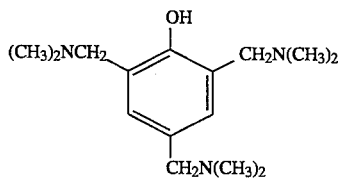

DABCO K-15: Potassium 2-ethylhexanoate
DABCO TMR:

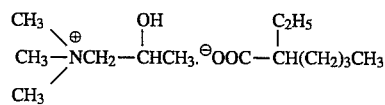

Curithene 52:

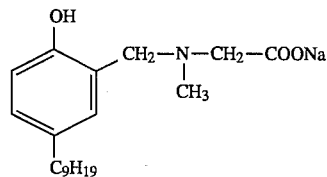

DABCO-T:
$(CH_3)_2NC_2H_4(CH_3)C_2H_4OH$

Note (3): Surfactant
Dimethylsiloxane-polyether block copolymer (produced by Toray Dow Coaning Co., SF-2936F)

Note (4): Phosphoric ester
TMP: trimethyl phosphate
TEP: triethyl phosphate
TBP: tributyl phosphate
TOP: trioctyl phosphate
CLP: tris(chloroethyl) phosphate
TCP: tris(cresyl) phosphate
TMCPP: tris(β-chloropropyl) phosphate
ODPP: octyl diphenyl phosphate
CR-530: halogen-containing condensed phosphoric ester (produced by Daihachi Kagaku Co.)
CR-505: halogen-containing condensed phosphoric ester (produced by Daihachi Kagaku Co.)

TABLE 3

| (Physical properties of the product of Example 5) | |
|---|---|
| Item | Physical properties |
| Free rise density | 22.3 kg/m$^3$ |
| Compression strength (//) | 1.7 kg/cm$^2$ |
| Bending strength (⊥) | 3.0 kg/cm$^2$ |
| Oxygen index | 26.0 |
| Closed cell content | 2.8% |
| Water absorption | 0.82 g/100 cm$^2$ |
| High-temperature dimensional stability | −0.22% |
| Low-temperature dimensional stability | −0.01 |
| Thermal and humid dimensional stability | −0.38% |
| Grade 3 burning test  Tdθ | 153° C. min |
|   CA | 108.5 |
|   After-flame time | 27 sec |

What is claimed is:
1. A process for producing a polyisocyanurate foam, which process comprises reacting an organic polyisocyanate, a polyol and water in the presence of a trialkyl phosphate having a molecular weight of 140 to 270 and a trimerization catalyst.

2. A process of claim 1, wherein said aliphatic phosphoric ester is at least one trialkyl phosphate selected from trimethyl phosphate, triethyl phosphate and tributyl phosphate.

3. A process of claim 1, wherein said trimerization catalyst is selected from (1) 2,4,6-tris(dimethylaminomethyl)phenol (2) 1,4-dimethyl-N-(2-dimethylaminoethyl)piperazine [CH₃—N(piperazine)N—CH₂CH₂—N(CH₃)₂]

(3) sodium salt of N-methyl-N-(2-hydroxy-5-nonylbenzyl)glycine (4) N,N',N''-tris(3-dimethylaminopropyl)-hexahydrotriazine-like piperazine derivative (5) potassium 2-ethylhexanoate (C₄H₉CH(C₂H₅)COOK)

(6) CH₃COOK (7) DBU salt with 2-ethylhexanoic acid (8) DBU salt with oleic acid: ⁻OC(CH₂)₇CH=CH(CH₂)₇CH₃

(9) choline 2-ethylhexanoate-like: (CH₃)₃N⁺CH₂—CH(OH)CH₃ · ⁻OOC—CH(C₂H₅)(CH₂)₃CH₃

(10) choline formate: (CH₃)₃N⁺—CH₂—CH(OH)CH₃ · ⁻OOCH

4. A process of claim 1, which comprises mixing said trialkyl phosphate ester with said organic polyisocyanate, and reacting the mixture with said polyol and said water in the presence of said trimerization catalyst.

5. A process of claim 1, wherein said organic polyisocyanate is reacted with said polyol and said water at an isocyanate index, defined as the NCO/OH equivalent ratio, of 1.8 or more.

6. A process of claim 1, wherein said polyol is at least one polyol having a hydroxyl number within the range of 20 to 600 mg KOH/g.

7. A process of claim 1, wherein said water is used in an amount of 0.3 to 3% by weight based on the total weight of said organic polyisocyanate, said polyol and said water.

* * * * *